United States Patent [19]
Betke

[11] 3,821,631
[45] June 28, 1974

[54] CIRCUIT FOR SHIFTING THE PHASE OF A SINE WAVE BY DIFFERENTIAL MEANS

[75] Inventor: Adolf C. Betke, Greenfield, Wis.

[73] Assignee: Litton Industrial Products, Inc., Milwaukee, Wis.

[22] Filed: Sept. 7, 1972

[21] Appl. No.: 286,957

[52] U.S. Cl............ 321/40, 307/262, 321/5, 321/18
[51] Int. Cl............................................. H02m 7/20
[58] Field of Search........... 307/262; 321/5, 18, 40, 321/42

[56] References Cited
UNITED STATES PATENTS

| | | |
|---|---|---|
| 3,116,446 | 12/1963 | Healey.................................. 321/18 |
| 3,593,105 | 7/1971 | Brohaugh........................ 321/40 X |
| 3,621,373 | 11/1971 | Mitchell et al........................ 321/5 |
| 3,624,486 | 11/1971 | Oates.................................... 321/18 |
| 3,644,753 | 2/1972 | Ginsberg.............................. 321/5 |
| 3,671,836 | 6/1972 | Kolatorowicz et al............. 321/5 X |

Primary Examiner—William M. Shoop, Jr.
Attorney, Agent, or Firm—Alan C. Rose

[57] ABSTRACT

A phase-shift network and a differential amplifier shift the phase of an AC input voltage by a predetermined amount to produce a sine wave voltage which may also reference to a circuit common voltage.

8 Claims, 3 Drawing Figures

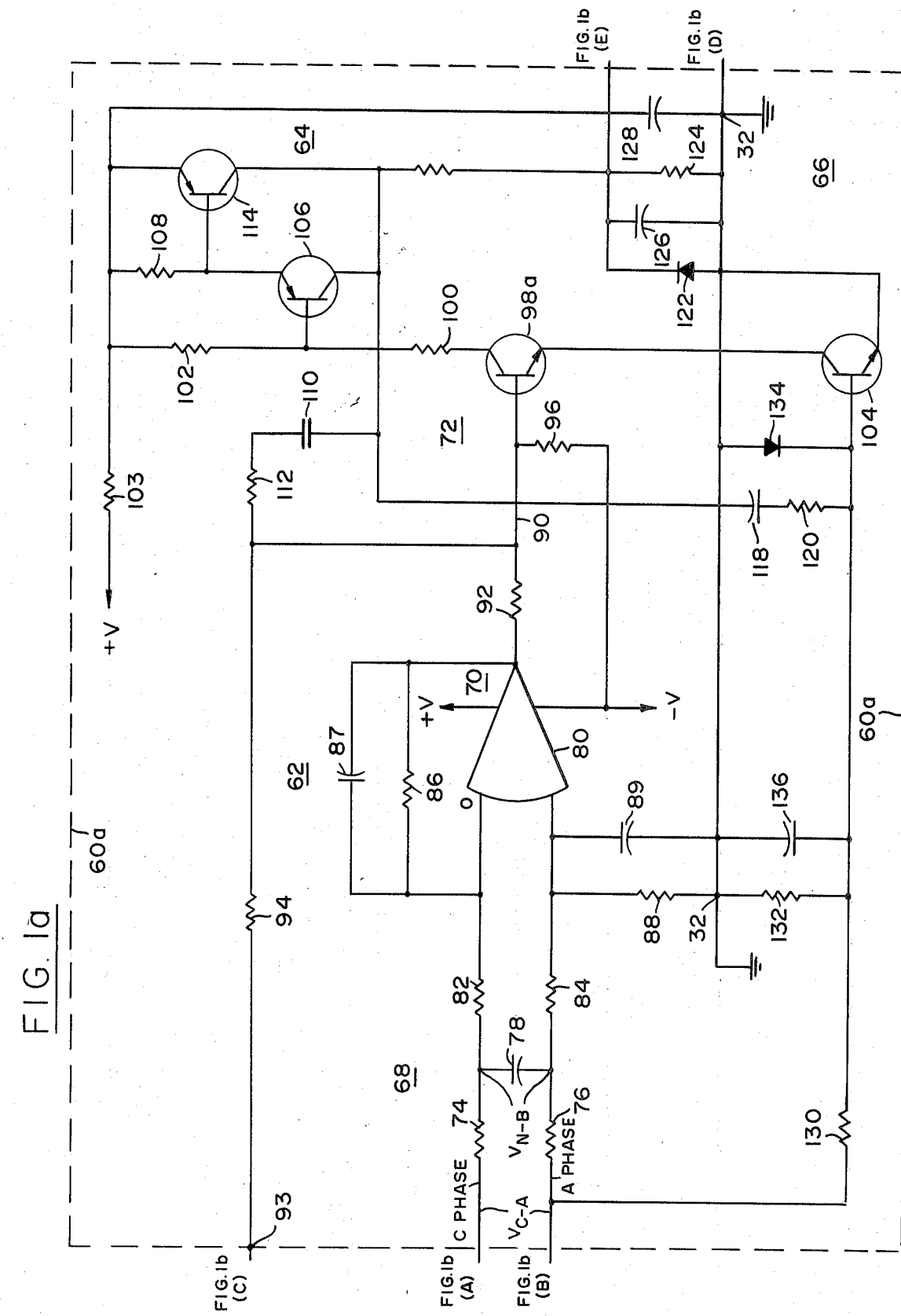

CIRCUIT FOR SHIFTING THE PHASE OF A SINE WAVE BY DIFFERENTIAL MEANS

CROSS REFERENCE TO RELATED APPLICATION

This application is related to an application for "A FIRING CONTROL CIRCUIT FOR GRID-CONTROLLED SWITCHING DEVICES" filed the same day by the same inventor.

BACKGROUND OF THE INVENTION

In AC to DC voltage converters of the prior art, the average DC output voltage is frequently made variable by controlling the firing angle of rectifying devices on the converter with respect to the period of each cycle in an AC input voltage. The rectifying devices utilized are frequently grid-controlled rectifiers, such as thyristors or thyratrons. A control circuit is utilized to provide a firing pulse to the grid or gate of the grid-controlled rectifying device to gate the rectifying device into conduction at the desired firing angle. To provide linear control over the average DC output voltage, such control circuits utilize a reference voltage which is produced by shifting the phase of the AC input voltage. The phase-shifted reference voltage is usually summed with a selectively variable DC voltage to control the generation of a firing pulse at the desired firing angle.

In AC to DC converters of the prior art, the phase-shifted reference voltage has been generated by using a reference transformer and appropriate phase-shift networks. Such control circuits utilizing reference transformers have the disadvantage that the transformers are relatively costly items. The use of a transformer is even more of a disadvantage where a three-phase AC voltage is being converted to a selectively variable DC output voltage. In three-phase circuits of the prior art, a three-phase transformer is utilized with associated phase-shift circuits.

SUMMARY OF THE INVENTION

The above and other disadvantages of the prior art are overcome by providing a control circuit utilizing a phase-shift network and a differential amplifier to produce an AC reference voltage having a sine wave form and phase shifted a predetermined amount from an AC input voltage. The AC reference voltage may be referenced to a circuit common or neutral by referencing the differential amplifier to the circuit common.

It is, therefore, an object of the invention to provide a control circuit which produces an AC reference voltage which is shifted in phase by a predetermined amount from an AC input voltage.

DESCRIPTION OF THE DRAWINGS

FIGS. 1a and 1b illustrate a schematic diagram of a three-phase, half-controlled bridge converter embodying the invention.

DESCRIPTION OF THE PREFERRED EMBODIMENT

Figure 1B:
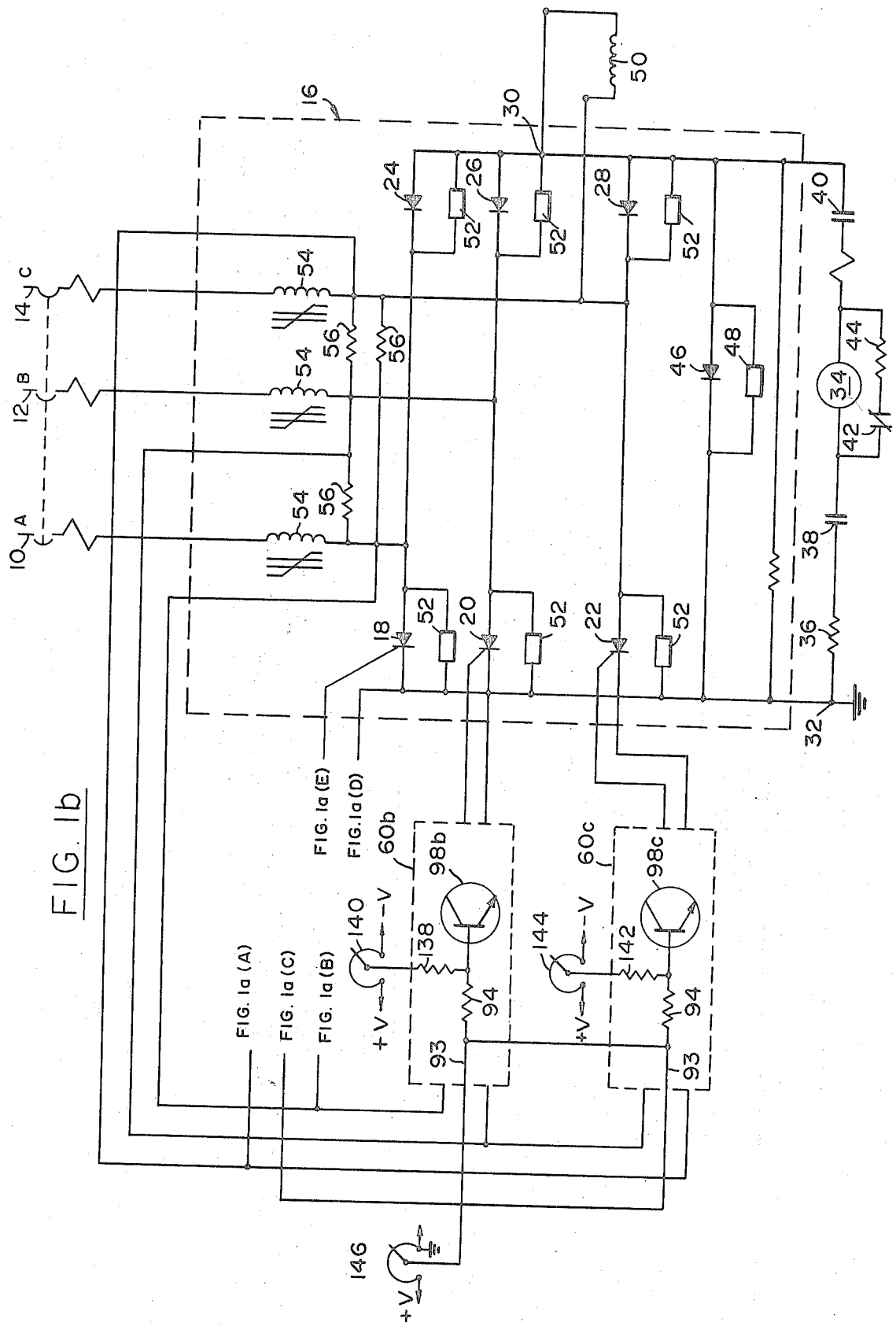

In FIG. 1 there is shown the control circuit of the invention utilized to control the DC output voltage of the three-phase, half-control thyristor bridge rectifier circuit. Half-controlled, three-phase thyristor bridges are well known in the art and will not be discussed in detail herein. However, the principles of the invention may be utilized to control thyristors connected in other kinds of circuits, such as a full-control bridge, or other switching circuits utilizing grid-controlled rectifiers and such as thyratrons and other devices having selectively variable duty cycles.

Switching circuits utilizing thyristors as controlled rectifiers can produce an average DC output voltage which is a function of the firing angle, and the maximum DC output voltage. Thyristors are grid-controlled devices which require a minimum voltage and/or current to be triggered into conduction and which may be used as rectifiers. The trigger pulse or voltage may be applied at any time during a half-cycle of AC line voltage applied to the thyristor of the proper polarity to sustain conduction.

For controlled bridge rectifiers, either half-control or full-control, and either single-phase or three-phase, there is a cosine relationship between the average DC output voltage and any firing angle selected. For the particular half-control, three-phase bridge shown in FIG. 1 the average output voltage $$V_{DC\ (ave)} = (1 + \cos \alpha/2)\ V_{DC\ (max)}$$

where alpha is the firing angle of the thyristors in the bridge.

In the circuit shown in FIG. 1, the three-phase AC input voltage is received via conductors 10, 12 and 14. The voltage on conductor 10 will be designated A phase, of conductor 12 B, and on conductor 14 C phase. This three-phase AC input voltage is applied to half-control rectifier 16. Rectifier 16 is a bridge rectifier comprising thyristors 18, 20, and 22 and diodes 24, 26, and 28. Rectifier 16 comprises a controlled converter connected in series with an uncontrolled converter, the three thyristors being the controlled elements and the diodes the uncontrolled elements. By varying the voltage of the controlled converter from maximum "adding" voltage to minimum "opposing" voltage, the combined output of the bridge rectifier can be controlled from maximum to approximately 0. To adequately control the thyristors in this half-control, three-phase bridge, a firing angle phase range of 0° to 180° is required.

The DC output voltage of the bridge is presented at conductors 30 and 32. Conductor 30 is a negative voltage bus and conductor 32 a positive grounded voltage bus.

The load on the bridge is the armature of a DC motor 34. Typical associated circuitry is shown, such as a sensing resistor 34, external contacts 38 and 40, in series with the armature and external contact 42 and dynamic breaking resistor 44 in parallel with the armature. Diode 46 is connected between conductor 30 and common conductor 32. The diode provides an alternate current path for load current to flow during periods of continuous conduction at large delay firing angles. Also the diode provides bridge operation down to 0 volts. Filter 48, which may be an R-C network, is connected across conductors 32 and 30 for eliminating transients thus smoothing the DC output voltage. Shunt field 50 is connected between C phase on conductor 14 and the DC output voltage bus conductor 30. This connection provides about an excitation voltage for the motor field. A filter 52, which may be an R-C network, may be connected across thyristors 18, 20, and 22 and across diodes 24, 26, and 28. A choke 54 may be utilized in series with the AC input voltage on conductors 10, 12, and 14 for smoothing out variations in this voltage.

Since the relationship between the average DC output voltage of rectifier 16 and the firing angle of the thyristors is a cosine relationship, a cosine wave reference voltage must be used to provide a linear transfer characteristic between the bridge output voltage and a control input to the circuit for firing the thyristors. This type of firing control is sometimes referred to as "AC rider" control. In the embodiment of FIG. 1, a positive DC control voltage is summed with a negative bias signal and a cosine wave. In each cycle of the input AC voltage the time when the sum is slightly positive with respect to a circuit common determines the firing angle in each cycle.

In the embodiment of FIG. 1, there is shown a firing circuit 60 for thyristors 18, 20, and 22. Firing circuit 60 includes a logic circuit comprising an AC reference circuit 62 and a firing amplifier 64, and also includes a firing amplifier inhibitor circuit. Each AC reference circuit 62 includes the 90° phase-shift circuit 68 and a differential amplifier circuit 70. Each firing circuit 60 also includes a comparator circuit 72.

In each AC reference circuit 62, each phase-shift circuit lags one phase of the three-phase AC input voltage by 90° and the differential amplifier circuit 70 attenuates, inverts, and level shifts the output of the phase-shift network to the voltage level of circuit common on conductor 32.

Comparator circuit 72 initiates the generation of a firing pulse when both of its input conditions are met and when enabled by inhibitor circuit 66. Input conditions for comparator circuit 72 to initiate a pulse are met when summation of a DC control voltage, an AC reference voltage, and a bias voltage are slightly positive with respect to circuit common on conductor 32. Inhibitor circuit 66 will enable comparator circuit 72 when a positive voltage (above approximately plus 10 volts) is sensed across a corresponding thyristor. Inhibitor circuit 66 will enable corresponding comparator circuit 72 only when the corresponding thyristor is not conducting.

To provide a firing gate pulse of a certain minimum pulse width, the feedback signal is applied to the input of inhibitor circuit 66 from the output of firing amplifier circuit 64. Unless this feedback signal is utilized, inhibitor circuit 66 will disable comparator circuit 72, which in turn will stop the firing pulse as soon as the conduction of the corresponding thyristor is sensed by inhibitor circuit 66. This is an undesirable condition which can cause thyristor failure.

Should a thyristor cease to conduct before the conduction period of the cycle ends, firing circuit 60 is capable of generating subsequent firing pulses. The thyristor might cease to conduct because of variations in the AC input voltage which reduce the voltage applied across the thyristor to a value below that necessary to sustain conduction.

Figure 2:
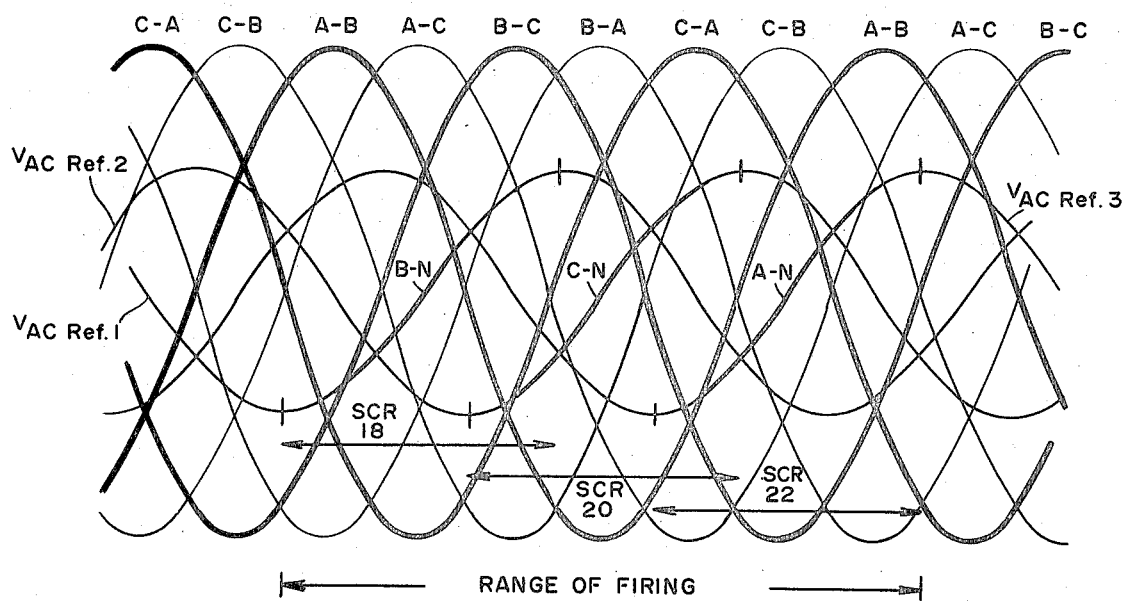
FIG. 2 is a graph showing the phase relationship of the three AC reference voltages with respect to line-to-line voltages of the three-phase AC input voltage.

FIG. 2 shows the line to neutral and line-to-line voltage for ABC phase sequence. Also shown are the ranges of the firing angles for thyristors 18, 20, and 22. To control the firing of thyristor 18, for example, a portion of a cosine wave in phase with $V_{B-N}$ may be utilized as an AC reference signal. To generate an AC reference signal in phase with $V_{B-N}$ the line-to-line voltage may be lagged by 90° and inverted. Lagging a line-to-line voltage and inverting it provides additional filtering while utilizing only an R-C filter.

AC reference circuit 62 should operate on both 50 parts Hz and 60 Hz operation without adjustment since it operates at the nearly flat portion of the angle versus log frequency curve and by simple R-C network.

Consider now the detail circuitry of the embodiment of FIG. 1 in AC phase-shift network 68, line-to-line voltage $V_{C-A}$ as applied to a phase-shift network comprising resistors 74 and 76 and capacitor 78. This phase-shift network shifts the voltage $V_{C-A}$ by approximately 90° to a voltage substantially in phase with $V_{N-B}$ (not shown) across capacitor 78. This voltage across capacitor 78 is then attenuated, inverted, and level-shifted to the circuit common 32 by differential amplifier 80. Resistors 82 and 84 attenuate the voltage $V_{N-B}$ to an appropriate level for inversion by differential amplifier 80. The input voltages to differential amplifier 80 must be limited to a range which can be accepted by the differential amplifier. The differential amplifier presents an output signal which is a cosine reference signal having an amplitude varying about the circuit common on conductor 32 and of line frequency. Resistor 86 is a feedback resistor for differential amplifier 80. Capacitors 87 and 89 provide additional lag in the output signal to amplifier 88 to compensate for any desired lag not effected by phase-shift network 68. Thus there has been developed at this point an AC reference voltage $V_{B-N}$ having a cosine relationship to the AC input voltage and having a usable range in the preferred embodiment from cosine $\alpha = -1$ for a zero firing angle to cosine $\alpha = +1$ for a 180° firing angle. Resistor 88 shifts the level of the AC reference voltage presented by differential amplifier 80 to the circuit common of conductor 32.

Conductor 90 is a summing point for three voltages, an AC reference voltage coupled by current resistor 92, a DC control voltage coupled from terminal 93 by resistor 94, and a bias voltage coupled from a negative voltage supply by resistor 96. Conductor 90 is connected to the base of transistor 98. The comparator circuits in all three firing circuits 60 are similar except that the comparator circuits 98b and 98c have an additional input which is discussed below. A positive voltage is applied to the collector of transistor 98 through resistors 100, 102, and 103. The base of transistor 98 is used as a summing node for the AC reference voltage, the DC control signal, and the bias signal using current summing resistors 92, 93, and 96, respectively. The DC control voltage applied to terminal 93 is a positive voltage variable from zero to a maximum magnitude of which is proportional to a predetermined firing angle for a corresponding thyristor and proportional to the DC output voltage of rectifier 16. The negative voltage applied to the summing point 90 through resistor 96 shifts the level of the AC reference voltage so that a control voltage of only positive polarity may be used. Assume for the moment that transistor 104 is conducting. Transistor 98 conducts when the sum of the currents at its base becomes slightly positive. Conduction in transistor 98 supplies driving current to firing the base of transistor 106 in firing amplifier circuit 64. The emitter of transistor 106 is connected to the positive voltage supply through resistors 108 and 103.

Conduction through transistor 106 supplies drive current to the base of transistor 114 in firing amplifier circuit 64. The emitter of transistor 114 is connected to a positive voltage supply through resistor 103. When transistor 114 conducts, regenerative current is applied to the base of comparator transistor 98 through a network comprising capacitor 110 and resistor 112. Regenerative current results in a gating pulse having a steep wave front.

The output of transistor 114 is a firing pulse coupled to the gate of a corresponding thyristor by resistor 116. The firing pulse drives the thyristor into conduction at the predetermined firing angle determined by the magnitude of the DC control voltage at terminal 93.

The firing pulse from transistor 114 is also applied to the base of transistor 104 through capacitor 118 and resistor 120. The application of the firing pulse to the base of transistor 104 prevents the firing amplifier inhibitor circuit 66 from prematurely disabling comparator transistor 98.

The firing amplifier inhibitor circuit comprises transistor 104 and associated circuitry. Transistor 104 is connected to sense conduction or non-conduction in a corresponding thyristor 18, 20 or 22. Emitter of transistor 104 is connected to the circuit common of conductor 32. The cathodes of thyristors 18, 20 and 22 are also connected to circuit common, conductor 32. Transistor 104 will conduct whenever it senses a positive voltage (exceeding a few volts) across its corresponding thyristor. A positive voltage drop across a thyristor will only occur when the thyristor is not conducting. Conduction through transistor 104 enables comparator transister 98 by completing a conduction path from circuit common, conductor 32 to the positive voltage source through transistor 98, resistor 100, resistor 102, and resistor 103. Transistor 98 will then conduct in accordance with its input condition.

Transistor 104 will cease to conduct whenever its corresponding thyristor is conducting. When its corresponding thyristor is conducting, there is no appreciable voltage drop across it, and therefore no drive voltage is sensed by transistor 104. Turning off transistor 104 disables transistor 98. The disabling of transistor 98 prevents the generation of a firing pulse even if the input condition in transistor 98 is such that a firing pulse would otherwise be generated.

Diode 122 is connected between the gate of the corresponding thyristor and circuit common to protect the thyristor gate from negative voltage. Resistor 124 by-passes any leakage current around its corresponding thyristor gate.

Resistors 130 and 132 comprise a voltage divider network connected between one line of the AC input voltage applied to resistor 76 and circuit common, conductor 32. The voltage applied to resistors 130 and 132 is the voltage across the corresponding thyristor. For example, in firing circuit 60a, the voltage applied to the resistor network is phase A of the three-phase input voltage which is also applied across thyristor 18. The voltage at the junction between resistors 130 and 132 and circuit common, conductor 32 is indicative of the state of conduction in the corresponding thyristor. When the corresponding thyristor is non-conducting, a voltage is sensed by the resistor network and applied to the base of transistor 104, causing it to go into conduction. Conduction in transistor 104 enables comparator transistor 98 as discussed above. When the corresponding thyristor is conducting, no voltage is sensed across it, and thus there is not a sufficient voltage at the junction of resistors 130 and 132 to sustain conduction in transistor 104. The turning off of transistor 104 disables comparator transistor 98 as discussed above.

The three firing circuits, 60a, 60b and 60c, are identical except for circuitry for adjusting tolerance differences between components in the three firing circuits. Circuit 60b has an additional resistor 138 connected between the summing point of comparator transistor 98 and an external variable resistor 140. Variable resistor 140 is connected between the positive and negative voltage supply. The offset level of the output voltage of transistor 98b may be adjusted to compensate for any tolerance differences.

Firing circuit 60c includes an additional resistor 142 similar in purpose to resistor 138. Variable resistor 144 is similar to variable resistor 140.

Variable resistor 146 is a means for supplying a DC control voltage to all three firing circuits. Variable resistor 146 is connected between a positive voltage and circuit common. For the embodiment shown in FIG. 1, the DC control voltage is varied between 0 volts and a maximum positive voltage. The magnitude of the DC control voltage corresponds to a predetermined firing angle for each of the thyristors 18, 20 and 22. For example, a control voltage of 0 volts would correspond to a firing angle of 180° for thyristors 18, 20, and 22 during the half-cycle period of induction in each of the three thyristors.

Consider now the operation of the circuitry shown in FIG. 1. The operation of firing circuit 60a and its corresponding thyristor 18 will be discussed. The operation of firing circuits 60b and 60c and their respective thyristors 20 and 22 is identical to the operation of firing circuit 60a. Assume that thyristor 18 is non-conducting.

Variable resistor 146 is adjusted to supply a DC control voltage to terminal 93. The DC control voltage is proportional and corresponds to a desired firing angle of thyristors 18, 20 & 22 & to a desired average DC output voltage in conductors 30 and 32 of rectifier 16. Linear control of the firing angle is achieved by summing the DC control voltage to terminal 93 with a cosine reference signal. The cosine reference signal is developed by a phase-shift network 68 and a differential amplifier 80. Phase-shift network 68 lags a line-to-line input voltage $V_{C-A}$ by a substantially 90° to produce a voltage across capacitor 78 substantially in phase with $V_{N-B}$. Differential amplifier 80 and its associated circuitry attenuate the signal across capacitor 78, inverted, and shift the level of this signal to the circuit common appearing on conductor 32.

Transistor 104 in inhibitor circuit 66 enables comparator transistor 98. Since thyristor 18 is not conducting, resistors 130 and 132, connected between phase A and circuit common, sense the voltage across thyristor 18 and drive transistor 104 into conduction.

Comparator transistor 98 will now conduct according to its input condition. The DC control signal, the AC reference signal, and a bias signal are added at summing point 90 transistor 98. Assume that a firing angle of 45° has been selected. The DC control voltage is positive and will have a magnitude of .853 times the maximum value which maximum represents a firing angle of 0°. From the sum of the DC control voltage, the cosine wave of the AC reference voltage and the bias signal becomes slightly positive, transistor 98 is driven into conduction.

I claim:

1. A circuit for controlling the firing angle of a grid-controlled rectifying device connected in a circuit having a common and an AC input voltage comprising:

a. an AC reference circuit coupled to said AC input voltage for producing an AC reference voltage shifted in phase from said AC voltage by a predetermined angle, said AC reference circuit comprising a differential phase-shift network generating a phase-shifted output voltage that is shifted in phase from the AC input voltage and a differential amplifier responsive to said phase-shifted output voltage and generating said AC reference voltage, said differential amplifier having said AC reference voltage referenced to the common of said AC circuits;

b. means for supplying a control voltage, the control voltage being selectively variable for controlling the firing angle of said grid-controlled device in each cycle of the AC input voltage;

c. a bias voltage means generating a negative voltage; and d. a firing circuit having an input coupled to said AC reference circuit for receiving said AC reference voltage and coupled to said means for receiving said control voltage and coupled to said bias voltage means for receiving said negative voltage, said firing circuit summing said AC reference voltage and said control voltage and said negative voltage to generate a gate pulse for biasing said grid-controlled device into conduction, said firing circuit having an output coupled to said grid-controlled device, the firing angle of said grid-controlled rectifying device being controlled by selectively varying the control voltage.

2. The device claimed in claim 1 wherein said differential phase-shift network comprises an R-C network for shifting the phase of an AC input voltage by a predetermined angle.

3. The device claimed in claim 1 wherein said control voltage is a selectively variable, positive DC controlled voltage.

4. The device claimed in claim 2 wherein the predetermined angle of phase shift between the AC reference voltage and the AC input voltage is a total of the phase shift produced by said R-C network and the phase shift produced by said differential amplifier.

5. A power supply of the rectifier type comprising:

a. a rectifier circuit connected across an AC input voltage, said rectifier circuit having at least one gridcontrolled means for rectifying an AC input voltage connected in circuit and having a pair of output terminals for presenting a DC output voltage, a positive one of said output terminals being a current common, the magnitude of the DC output voltage being proportional to the firing angle of said grid-controlled rectifying means;

b. an AC reference circuit coupled to receive said AC input voltage for producing an AC reference voltage shifted in phase from said AC input voltage by a predetermined angle, said AC reference circuit comprising a differential phaseshift network generating a phase-shifted output voltage that is shifted in phase from the AC input voltage and a differential amplifier responsive to said phase-shifted output voltage and generating said AC reference voltage, said differential amplifier generating said AC reference voltage referred to said circuit common;

c. means for supplying a control voltage, the control voltage being selectively variable and corresponding to a predetermined angle with respect to a cycle of the AC input voltage;

d. a bias voltage means generating a negative voltage; and e. a logic circuit having an input coupled to said AC reference circuit for receiving said AC reference voltage and coupled to said means for receiving said control voltage and coupled to said bias voltage means for receiving said negative voltage, said logic circuit summing said AC reference voltage and said control voltage and said negative voltage to generate a control pulse at said predetermined angle with respect to a cycle of the AC input voltage, said control pulse coupled to said rectifier circuit for gating said grid-controlled rectifying means into conduction in each cycle of the AC input voltage.

6. The device claimed in claim 5 wherein said rectifier circuit comprises a half-controlled, single-phase bridge rectifier circuit.

7. The device claimed in claim 5 wherein said rectifier circuit comprises a half-controlled, three-phase bridge rectifier circuit.

8. A control circuit generating an output control pulse having a selectively variable angle relative to a cycle of an AC input voltage, the control circuit comprising:

a. a phase shift circuit means coupled to the AC input voltage and generating a predetermined phase-shifted output voltage signal that is shifted in phase from the AC input voltage by a predetermined angle, b. a differential amplifier means responsive to said phase-shifted output voltage signal and generating an AC reference voltage signal having a selected cosine relationship to the AC input voltage, c. a DC control voltage means generating a selectively variable positive voltage signal corresponding to said predetermined signal relative to a cycle of the AC input voltage, d. a bias voltage means generating a negative voltage signal, and e. a circuit summing means responsive to said AC reference voltage and positive and negative voltage signals, said summing means generating the output control pulse at said predetermined angle.

* * * * *